Aug. 26, 1930.                A. LESTI                 1,774,146
                      RADIO STATION INDICATOR
                         Filed Nov. 14, 1927
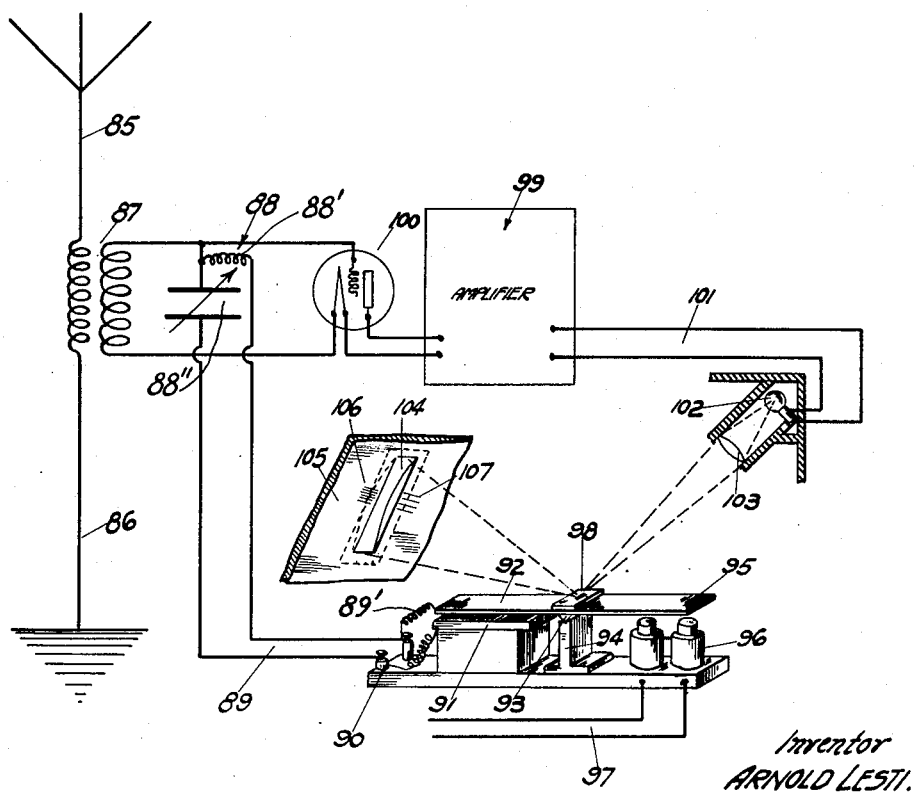
Inventor
ARNOLD LESTI.
by Hazard and Miller
Attorneys.

UNITED STATES PATENT OFFICE

ARNOLD LESTI, OF LOS ANGELES, CALIFORNIA

RADIO STATION INDICATOR

Application filed November 14, 1927. Serial No. 233,115.

My invention is a radio station indicator to give a visible indication of the various radio transmitting stations which at the time are transmitting.

In radio reception such as broadcasting reception, if the person receiving does not know what broad-casting stations are on the air, it is necessary to operate the tuning mechanism over a considerable range in wave lengths or kilocycles in order to ascertain the stations which may be heard, and then more accurately tune in on the desired station. Another procedure is that if a person knows about where on the dial different stations would be received when the pointer is pointing to known positions, he may then try indiscriminately a number of different places to find out if such stations are on the air.

An object of my invention is to automatically give a visible indication of all the stations which are transmitting within the range of the particular receiving set which a person might have for receiving and to indicate on a scale of some sort all of such stations; then a party desiring to receive a signal may tune in on any one of the desired stations which are indicated visibly.

As the different stations transmitting are of different wave lengths and kilocycles, there is usually quite a considerable field of frequencies which require to be explored. By my invention I obtain what might be designated as a spectrum of the frequencies being transmitted from all the stations which the receiving set is designed to receive.

I find I may obtain substantially a similar effect by having the vacuum or gaseous type of lamp stationary and have a mirror vibrated at a predetermined speed, so that the light from the lamp if continuously lit would flash across the dial backwards and forwards, and the rate of vibration of the mirror should be such that this would give a continuous light due to the persistence of vision. Coupled with the vibrating mirror is a variable element of a radio reception tuner which tunes the circuits connected through an amplifier to the vacuum or gaseous tube light so that this light is illuminated and extinguished a number of times on each oscillation of the mirror in accordance with the number of transmitting stations detected by the tuner, this arrangement giving a series of spots of light which may be read on a suitable indicating dial.

In constructing my invention I may arrange this in a simple type to be utilized merely to give a visible indication of substantially all of the transmitting stations which at the time are on the air, and which the tuner is desired to detect. Or I can hook up my visible indicator with a radio receiving set so that when the indicator is operating and shows a number of stations as being on the air, a pointer may be turned on the scale to any one of such stations and this will position a variable element of the tuner to receive from this station. The visible indicator may then be cut out and a receiving device, such as a loud speaker, switched in to receive the signal from the particular station desired.

My invention in its various aspects will be more readily understood from the following description and drawing, the drawing being in diagram, in which:

The figure is a diagram of a type of indicator using a stationary light and a reflecting mirror.

In the construction shown in the figure the antenna collector is indicated by the numeral 85 having a ground connection 86 and a coupling 87 to a tuning circuit designated generally by the numeral 88. The output leads 89 of this tuning circuit are connected to binding posts 90, one of which leads to a fixed plate 91 and the other to a movable plate 92 of a condenser, this condenser being part of the tuner. A wire spring 89' forms the electrical connection from one of the binding posts 90 to the end of the movable plate 92 which is over the fixed plate 91. This spring functions to exert a pull urging the plate 92 towards the plate 91. The tuning circuit 88 employs an inductance 88' and a variable condenser 88''.

The plate 92 is indicated as having a knife edge 93 mounted on a balance fulcrum 94. The other end 95 of the lever is in a position to function as an armature for the electro-magnets 96, these having leads 97 and controlled in any suitable manner as by an alternating current of the desired frequency to give a periodic current and periodic energization of the magnets and hence oscillate the plate 92 at a predetermined rate. A mirror 98 is mounted on the plate 92.

An amplifier 99 is indicated as having an amplifying triode tube 100 as a power unit therefor, and the output leads 101 are connected to a vacuum or gaseous lamp 102 focused by the lens 103 on the mirror 98, and the light from the mirror preferably shines on a translucent screen 104 mounted in a panel 105 which panel has graduations 106 which may indicate meters, and other graduations 107 which may indicate kilocycles.

The manner of operation and functioning of the device of the figure is substantially as follows: When the electro-magnets 96 are actuated by a suitable current to vibrate or oscillate the plate 92 at a predetermined rate, the capacity between the plates 91 and 92 is varied, and hence the tuning of the tuning circuit. This is arranged so that the change of capacity which is a change of the variable element of a tuner is sufficient to have the tuner respond to the range of frequencies desired to detect. Therefore, when the plate 92 vibrates, the tuned in circuits are amplified and illuminate the lamp 102; and as the mirror 98 is oscillated, the beam of light, if continuous, would swing across the scales indicated by 106 and 107. But as this illumination of the lamp 102 is not continuous, but intermittent, and as it flashes at each station tuned in having sufficient amplitude, it gives the effect of a series of spots of light on the screen 104 and from such spots of light the wave length and kilocycles of the stations transmitting may be readily ascertained.

It is obvious in this arrangement that the plate 92 may be oscillated slowly and by hand if desired so that the lamp 102 will remain illuminated for the desired length of time at each station which is transmitting. Therefore by this means a person may readily ascertain the stations transmitting and select the station he desires to hear, and then tune in the audible signal received from such station.

My invention also comprehends a method of visibly indicating radio transmitting stations, and in its simple form may be considered as receiving and tuning to resonance of transmitted frequencies and causing such tuned signals to give a visible indication. Such visible indication may be by causing an illumination of a lamp. The method in a more advanced step embodies receiving and tuning to resonance of the frequencies transmitted from signalling stations and periodically varying the tuning so that a lamp is periodically illuminated and extinguished in accordance with the transmitting stations properly tuned in. And as a further step of the method, the beams of light from the lamp may be shifted sufficiently rapidly and with a period consonant to that of the tuning so that a series of separate and spaced spots of light will show up due to the persistence of vision.

Then there is a still further procedure, an audible receiving station may be tuned in by operating a tuning device with a pointer to register with the different spots of light.

In the description and claims where I refer to the shifting of the light or the shifting of the beam of light or rays of light, this shifting may be done either by bodily moving the lamp or by having a stationary lamp and reflecting the rays of light. Other ways of accomplishing this result may be utilized.

Various changes may be made in the principles of my invention without departing from the spirit thereof, as set forth in the description, drawings and claims.

I claim:

1. A radio station indicator comprising in combination means to receive radio signals, means to tune to different frequencies to receive different signals, means to periodically operate the tuner over a range of frequencies, a fixed lamp, means to illuminate said lamp when the tuner is in resonance with various frequencies transmitted, and means to indicate by light reflected in different positions the various frequencies to which the lamp responds and thereby indicating the various stations transmitting and tuned in.

2. A radio station indicator comprising in combination a tuning device for radio waves having a vibrating element, a reflector connected to the vibrator, a fixed lamp shining a beam of light on said reflector, a scale over which the reflected beam of light may move, and means to illuminate the lamp when the vibrator is in tune with incoming waves.

3. A radio station indicator comprising in combination a tuner for a radio reception circuit including a continuously operated vibrating device, said device in its vibration varying the tuning through a plurality of frequencies, a reflector operated by the vibrator, a fixed lamp projecting a beam of light on the reflector, the light being reflected onto a scale, and means to illuminate the lamp when the vibrating element establishes a tuning in resonance with incoming signals, the vibrator being operated sufficiently rapidly to give the appearance of continuous illumination at particular place or places on the scale.

4. A radio station indicator comprising in combination a tuner having a condenser with one element vibrating in relation to the other element and giving a tuning through a plurality of frequencies, a fixed lamp, a reflector operated by the vibrating condenser, the lamp projecting a beam of light on the reflector and the reflector transmitting the light to a scale, and means to illuminate the lamp when the tuning circuit is in resonance with an incoming signal.

5. A radio station indicator comprising in combination a tuner including a condenser, one element of which is continuously vibrated at a high rate of speed, the vibration changing the tune through a plurality of frequencies, a fixed light, a reflector mounted on the movable element of the condenser, a beam of light from the lamp being projected on the reflector and from the reflector reflected onto a scale, an amplifier in circuit with the tuner, the lamp being in circuit with the amplifier, whereby the lamp becomes illuminated when the tuner is in resonance with an incoming signal, the rapidity of movement of the reflector giving the appearance of a fixed band or bands of light on the scale.

6. The method of visibly indicating radio transmitting stations, comprising receiving and tuning to resonance corresponding to a signal or signals received, causing such signals to illuminate a fixed lamp when the tuner is in resonance with such signals, reflecting a beam of light from the lamp by vibration along a scale, the position of illumination on the scale indicating the particular frequencies of incoming signals with which the tuner is in resonance.

7. The method of visibly indicating radio transmitting stations, comprising rapidly and continuously varying a tuner including a vibrating condenser through periodic cycles, illuminating a fixed lamp through the agency of the incoming tuned signals in resonance with the tuner, operating a reflector by the vibrating condenser and reflecting a beam of light from the lamp onto a scale, thereby indicating by a spot or spots of light the frequencies of the incoming signals.

In testimony whereof I have signed my name to this specification.

ARNOLD LESTI.